Feb. 10, 1953     R. E. STEELE ET AL     2,627,641
MULTIPLE GUTTER MOLD
Filed July 14, 1949     3 Sheets-Sheet 1
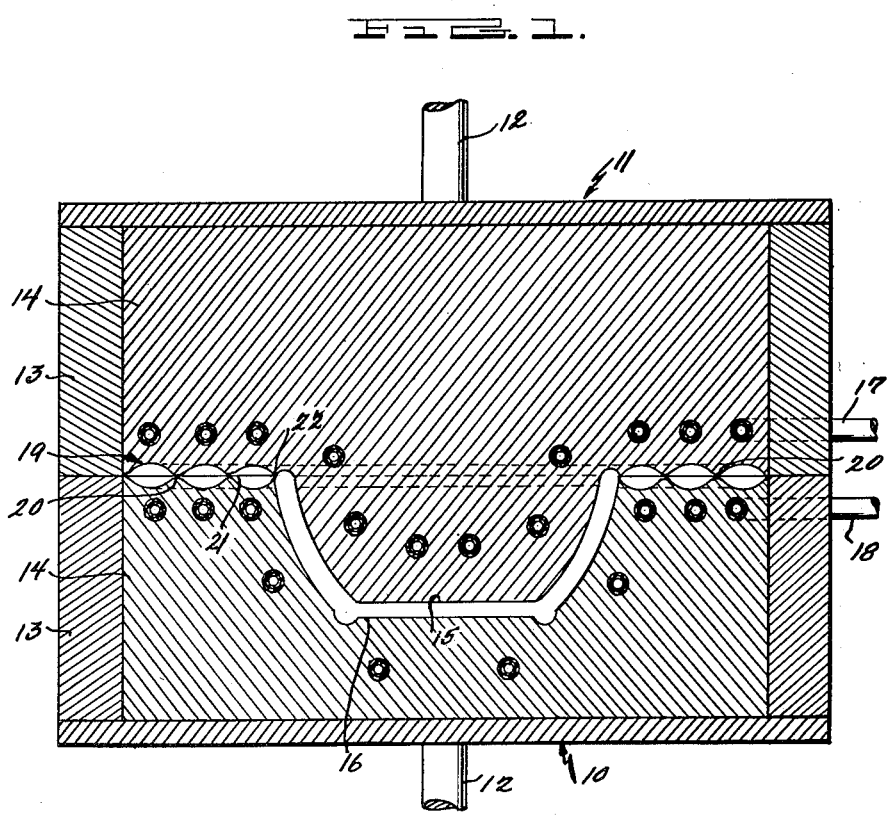
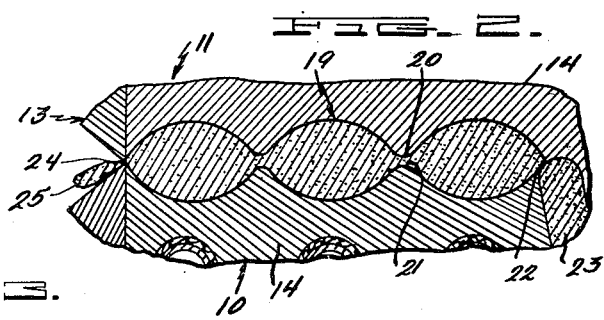
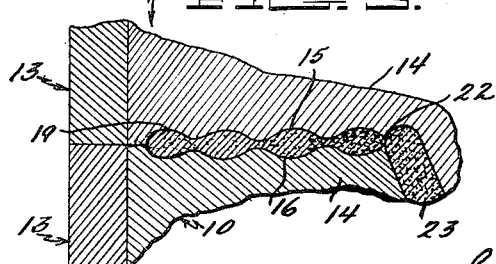
INVENTORS
JACOB JORDAN
RICHARD E. STEELE
BY
Semmes, Keegin, Robinson & Semmes
ATTORNEYS

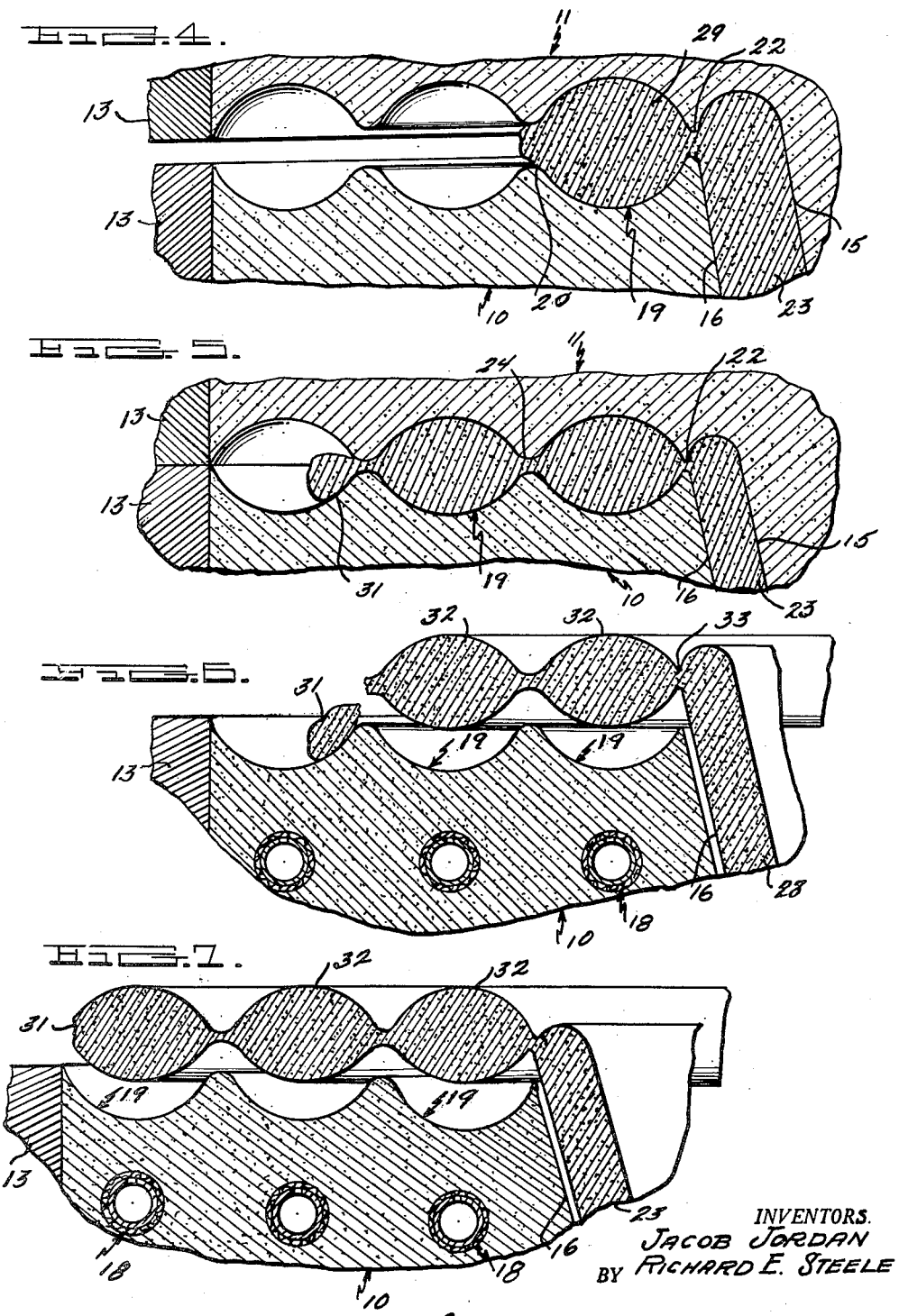

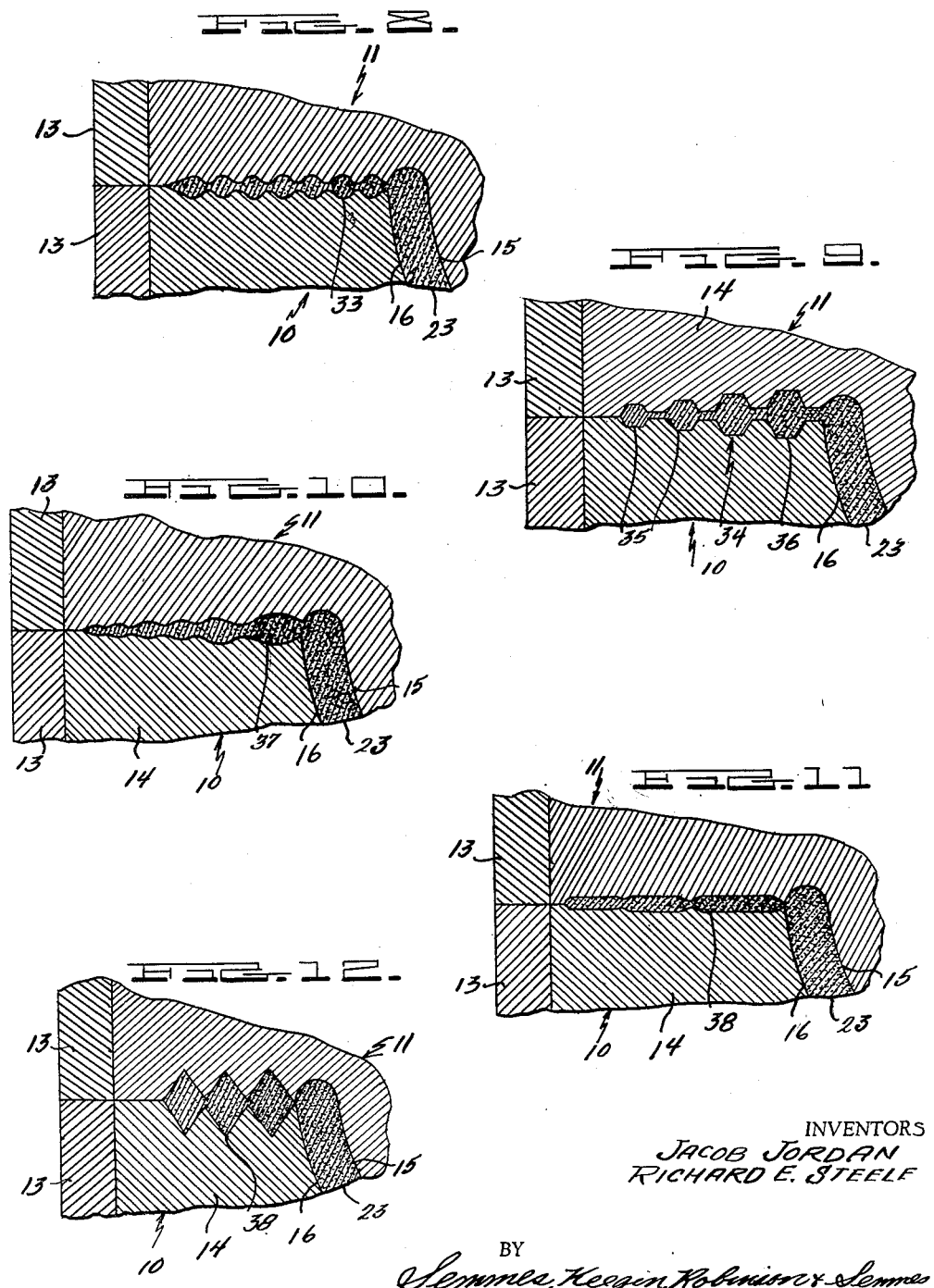

UNITED STATES PATENT OFFICE 2,627,641

MULTIPLE GUTTER MOLD

Richard E. Steele and Jacob Jordan, New Castle, Pa., assignors to Ram, Incorporated, Detroit, Mich.

Application July 14, 1949, Serial No. 104,638

3 Claims. (Cl. 25—129)

The present invention relates to improvements in the manufacture of ceramic ware and has particular reference to an improved mold structure and method of molding ceramic ware for use in ware pressure forming operations.

In ware forming operations embodying the use of opposed mold sections, a plastic material such as wet clay, is placed upon the forming faces of the molds and subjected to pressure to form the ware. Upon separation of the molds, the ware may then be dried sufficiently whereby the formed piece of war separates from the mold face by shrinkage. In application Serial No. 734,174 filed March 12, 1947, now United States Letters Patent No. 2,584,109, there is disclosed a novel method and apparatus for effecting the release of formed pieces of ware from the faces of the opposed molds, employing fluid pressures as the ware release medium, whereby deformation of the formed piece in the separation step is avoided. The ware may be forwarded directly to a drying operation to condition the ware for subsequent firing or other treatment, without the elapse of the usual substantial period of time necessary to accomplish separation of the ware by shrinkage.

In pressure forming operations, wet clay charges are served to the molds in the form of bats containing sufficient clay to prevent starvation of the mold surfaces through improper or inadequate distribution of clay thereover as the forming pressure is applied to the clay bat. Clay in excess of the amount needed for the forming of the ware normally may be extruded over the sides of the mold or received in an annular cavity in the mold, and must be removed therefrom before a subsequent ware forming operation is initiated. Once pressed, this clay in excess of that required to mold the piece, may be referred to as "flash" and may be gathered and processed as scrap for re-use in subsequent ware forming operations.

It will be appreciated that in commercial ware forming operations, substantial amounts of excess clay must be cleared from the molds and disposed of. This disposal problem has been met heretofore by the provision of special clay collection machinery requiring supervision by personnel to strip excess clay from the mold faces and sides, and to wash the molds after each forming operation. Thus, even employing highly developed automatic machinery, the per unit cost of each piece of ware has not been reduced appreciably.

It is an object of the present invention to provide molds for use in ware forming operations, wherein the problem of waste clay or flash disposal is minimized, the faces of the molds being cleansed subsequent to each article forming operation.

A further object is to provide a porous mold structure having a ware forming face provided with means for processing a plastic clay charge whereby the flow of clay across the ware forming face is controlled and removal of flash and disposal thereof from the ware forming face is facilitated.

A further object is to provide a method of forming ceramic ware in a pressure forming operation, wherein excess clay in the clay charge is formed integrally with the formed ware as flash, whereby both the formed piece of ware and flash may be removed from the mold surface after completion of the pressure forming operation.

A further object is to provide novel molds for use in ware pressure forming operations whereby the speed of application of pressures to the plastic clay mass may be accelerated to any desired point with a minimum of loss of internal pressures applied to the clay body, thereby accomplishing maximum expression of water content.

A further object is to provide an apparatus for the pressure forming of ware embodying opposed cooperable molds provided with means for effecting the quick release of the formed ware and excess clay in the clay charge as a unit from the mold faces immediately subsequent to the forming operation.

A further object is to provide a mold for use in a pressure forming operation provided with a forming face, the mold surface adjacent the forming face being contoured so as to receive and impede the flow of clay away from the forming face during the forming operation, thereby densifying and compacting the entire plastic clay charge, facilitating removal thereof from the mold face, and materially increasing the internal pressures exerted on the clay mass.

A further object is to provide a method for treating a plastic clay charge in a molding operation, whereby excess clay in the charge is subjected to at least the same pressures as the clay forming the ware body and even higher pressures, the excess clay forming a rim on the ware body readily removable from the mold face as a part of the ware body, the rim or "flash" separating easily from the body of the ware for disposal as scrap.

A further object is to provide a mold face provided with a series of annular grooves or gutters which impede and restrict the flow of clay over the mold face, whereby mechanical pressure exerted on the clay body results in high internal clay pressures in the clay body in the ware forming cavity of the mold.

Other objects and advantages of the invention will be apparent from the following detailed description thereof in the drawings, wherein:

Figure 1 is a vertical section of opposed molds employed in a pressure forming operation, formed in accordance with the invention;

Figure 2 is a fragmentary enlarged cross sectional view of a preferred form of mold contour adjacent the forming faces of two opposed molds;

Figure 3 is an enlarged view of a modified mold contour;

Figure 4 is an enlarged fragmentary cross sectional view of opposed molds, showing the action of the molds on the clay in the initial stage of the pressure forming operation;

Figure 5 is a similar view showing the position of the excess clay or flash in the charge in the mold gutters at the final stage of the pressure forming operation;

Figure 6 is a similar view showing removal of the pressed ware body and the detachable rim comprised of excess clay charge or flash, by a pressure release operation;

Figure 7 is a further view thereof in accordance with the invention;

Figure 8 is a view of a modified form of mold gutter design, for use with the invention; and Figures 9 through 12 are further views of mold gutter designs employed in connection with particular ware pressing operations.

In its broadest application, the invention embodies the provision of a mold for use in a ware forming operation, the forming face of the mold being contoured whereby excess molding material in the charge served to the mold is compacted and densified as an integral part of the formed ware and is removed therewith subsequent to the forming operation, thereby eliminating the presence of residual molding material particles or masses on the faces and sides of the mold. The invention is particularly adapted for use in connection with ware pressure forming operations embodying the use of opposed cooperable mold sections operable between an open and a pressing position.

The excess molding material which may be, for example, plastic clay, may be conveniently formed as a rim on the ware body which may comprise a plurality of rings, joined by thin pieces of pressed clay positioned about the molded ware body and joined thereto by a relatively thin portion of clay forming a fracture line, whereby the excess clay rim separates or may be separated cleanly from the molded ware body at any point in the process subsequent to the forming operation.

The invention is advantageously employed in connection with porous molds provided with fluid pressure conduits embedded in the molds for the application of a blanket of fluid pressure across the face of the entire mold to effect a quick release of the ware therefrom subsequent to the pressure forming operation, in the absence of the usual ware shrinkage.

The objects of the invention are accomplished by forming a mold surface or the surfaces of two opposed molds to provide a ware forming surface, and a plurality of annular cavities or gutters extending around the ware forming surface of the mold to receive excess clay expressed from between the ware forming surfaces in the final stages of the ware pressure forming operation. The gutters are so formed as to control and retard axial dispersion of the excess clay in a direction away from the ware forming cavities, under the forming pressures, forming back pressures insuring the formation of a properly compacted and densified piece of ware and minimizing possibilities of starvation of portions of the molds due to improper distribution of clay thereover. The gutters also accomplish the compacting and densifying of the excess clay in the charge as flash forming an integral part of the ware body.

Referring now to the drawings, the invention is disclosed as employed in connection with two opposed cooperable male and female mold sections 10 and 11, provided with suitable actuating mechanism represented by shafts 12 whereby relative movement of the mold sections is accomplished for a pressure forming operation. Each mold section embodies a mold ring 13 containing a mold body 14 which may preferably be made of a porous material capable of moisture absorption, the material being sufficiently porous to permit the expression of fluid pressure therethrough in the direction of the opposed ware forming surfaces 15 and 16. This is accomplished by means of fluid pressure conduits 17 and 18 embedded in the porous mold bodies and extending therethrough in spaced relationship with the mold faces and positioned so that the component parts of the conduits generally parallel the contours of the mold faces, whereby an evenly dispersed blanket of fluid pressure may be forced through the mold bodies to the mold faces. The conduits 17 and 18 are connected with a source of fluid pressure, which may be air pressure, not shown.

In accordance with the present invention, the ware forming surfaces 15 and 16 of the opposed mold sections are encircled with a plurality of excess clay collecting cavities or gutters 19 formed in the mold surfaces. These gutters 19 may be of any desired cross section, and preferably are provided in numbers of two or more for each mold surface, three being shown in the drawings. The gutters 19 are defined by spaced parallel projections 20 positioned in opposed relationship on the mold surface, the opposed projections 20 also defining restricted apertures 21 when the molds are in closed or pressing position as shown in Figure 1. It will be noted that lateral movement of excess clay in the charge from the area of the ware forming cavity defined by the surfaces 15 and 16, across the gutters 19 is retarded by the projections 20 and that the gutters 19 on each mold surface are so formed in opposed relationship with the gutters on the companion mold, whereby as the mold sections are brought together in the final stage of a pressing operation, a passageway is provided for the outward expression of excess clay from the ware forming surfaces 15 and 16. A very thin aperture is defined by the opposed projections 22 formed on each of the mold faces at points adjacent the outer edges of the ware forming surfaces 15 and 16 at the rim of the ware body 23 (Figure 2).

Thus, the body of excess clay collected in the gutters 19 is attached to the ware body 23 by a thin portion of pressed clay, forming a fracture line for separation of the pressed excess clay charge which is then referred to as "flash," from the body of the ware subsequent to removal of the formed unit comprising the ware and the attached flash from the pressing zone.

The cross section of the area defined by the multiple gutters 19 formed when the opposed molds are brought together in a pressure forming operation, may vary in accordance with the requirements of a particular pressure forming operation. As shown particularly in Figure 2, for the general purposes, the area defined by gutters 19 may conveniently be eliptical in cross section forming excess clay into evenly contoured and relatively shallow rings of flash. In some cases, it may be desirable to form the mold rings 13 with meeting knife edges 24 at the plane of mold separation, which will assist in cleansing the opposed mold rings of clay obstructions which might interfere with the subsequent operation, such as the clay residue 25.

Where it is desired to enhance the clay compacting action of the multiple gutter mold structure on the main ware forming charge, it has been found that gutters contoured as shown in Figure 3 are to be preferred. In this construction, the opposed surfaces of the two mold sections 10 and 11 adjacent the ware forming faces 15 and 16 are contoured with a plurality of interconnected annular rings or flash gutters 19 of cross section less than the thickness of the ware body 23. In this embodiment of the invention, the gutters 19 on the mold faces exert the compressing action on the flow of excess clay in degree greater than the compressing forces being exerted on that portion of the charge forming the ware body whereby movement of excess clay outwardly is restricted increasingly as the molds are brought to the closed position.

An example of operation of molds constructed in accordance with the invention is shown in step by step sequence in Figures 4 through 7. In Figure 4, the mold sections 10 and 11 are shown in partially open position prepared for movement inwardly towards each other to full pressing position in the pressure operation cycle. The ware to be formed is defined by the mold forming surfaces at 15 and 16. The stage represented by Figure 4 normally is preceded by the placement of a bat of wet plastic clay containing clay in excess of that required to form the ware, in the center portion of the lower mold surface 15, this bat of clay being dispersed outwardly in all directions as pressure is applied thereto. Excess clay 29 is forced radially outwardly from the center of the forming faces 15 and 16 through the rim aperture defined by projections 22, which gradually decreases in width as the mold sections approach each other. The clay 29 is forced into the first gutter 19, gradually filling the gutter as the application of pressure on the clay bat increases. The free flow of the clay towards the mold ring 13 is impeded by the projections 20 exerting a back pressure upon the clay mass which must be overcome by the forming pressures. In this manner the first gutter 19 is filled with excess clay as shown in Figure 4, and the clay then forced through the aperture 21 defined by the projections 20 to initiate the filling of the second gutter 19. It will be appreciated that the back pressure on the outward flow of clay increases as the mold sections 10 and 11 approach the pressing position shown in Figure 5. In this position, it will be noted that the second gutter 19 has been filled with sufficient excess clay charge to provide a small residual clay overflow portion 31, extending into the third or outermost gutter 19 adjacent the rim of the mold.

Due to its small size, no pressure is exerted on the residual clay portion 31 by the mold surfaces. This portion of the excess charge rests uncompacted in the outermost gutter 19. As shown in Figure 6, upon the application of fluid pressure from the coils of the conduit 18 through the face of the mold, the ware body 23 and the compacted portions 32 of the excess clay charge or flash compressed in the gutters 19 are removed cleanly from the mold face as an integral unit, the flash portions 32 being attached to the ware 23 by a thin strip 33 forming a point of cleavage or fracture line therebetween. As the residual uncompressed portion of the clay 31 has not been subjected to compression, it is relatively unaffected by the fluid pressure emanating from the conduit 18 embedded in the mold body under the outermost gutter 19 on the mold face and may or may not remain in place. Thus, it will be observed that a substantial portion of the excess clay in the charge is removed cleanly from the mold surface as flash forming an integral part of the ware in the pressure release operation.

As subsequent ware forming operations proceed, the residual portion 31 of surplus clay if not removed with the ware, is gradually increased during each succeeding pressure operation until such time as the outermost gutter 19 is completely filled with clay, whereby the surplus portion 31 may be sufficiently compressed during a succeeding ware forming operation to be blown clear of the mold forming face along with the internal portions 32, thereby cleansing the mold face of accumulated excess clay.

Several different modifications of multiple gutters 19 are shown in Figures 8 through 12. These gutters are designed to obtain certain desirable effects both in the pressed ware and the flash, from the standpoint of clay density and freedom from water of plasticity. In Figure 8, there is shown a plurality of gutters 33 smaller in cross section than the cross-sectional area of the ware body 23. In this construction the excess clay will be compressed into a plurality of annular rings having a density greater than that of the ware body itself. During the forming operation, the greater density of the flash will markedly increase the resistance to the flow of the clay outwardly from the mold face. This prevents the flashing of the clay outwardly when the molding pressure is applied quickly whereby a compact ware body is reserved between the forming faces of the mold when the molds are in the full pressing condition. It will be observed that if the clay were allowed to flow freely outwardly, with a quick pressure stroke, substantially less clay would remain between the ware forming faces whereby at least part of the molding pressure would be lost as far as the ware is concerned, being exerted on the mold rings.

In Figure 9, a modified form of gutter 34 is shown embodying a plurality of gutters decreasing gradually in cross-sectional area towards the outer rim of the mold. In this construction, the excess clay forced into the outer gutter 35 would be subjected to the greatest pressure, thoroughly dewatering the clay and setting up back pressures resisting further outward movement of the clay under the forming pressures. On the other hand, the inner gutter 36, being of greater cross-sectional area than the ware body, will tend to be subjected to less pressures than the clay in the outer gutter. This construction has the advantage of eliminating any tendency towards mold chipping at the rim aperture due to excessive densifying of the clay in the gutters before the molds are fully closed.

The modification shown in Figure 10 shows the gutter 37 formed with gradually curved surfaces, the action of this construction being similar to that described in connection with Figure 9.

A further embodiment of gutter 38 is shown in Figure 11, for use when it is desired to completely dewater the flash portion of the clay charge before the molds are brought into full pressing position.

The construction shown in Figure 12 embodies opposed V-shaped gutters 38, of greater cross-sectional area than that of the ware body. In this construction, the flash is never dewatered to the same degree as the ware, facilitating reuse with a minimum of processing. The only resistance to outward flow of the clay is offered by the gutter projections. Accordingly, relatively slow pressure strokes may be applied in forming the ware, thereby preventing splash of the clay outwardly over the mold surfaces before the clay forming the ware body is properly compacted for the final pressures accompanying the removal of water. A relatively high speed pressure stroke will produce a press clay body having a higher moisture content.

It will be thus observed that with molds constructed in accordance with the invention, substantially all of the clay bat initially served to the molds for the ware forming operation is removed therefrom with the ware as flash, when the ware forming operation has been completed. Small residual portions of excess clay remaining on the mold surfaces are collected at a point well removed from the ware forming surfaces of the molds and accumulated during successive pressing operations until a sufficient amount gathers for effective compression in the pressure forming operation. At this time, all residual accumulations of excess clay are also removed along with the pressed ware.

The multiple gutter construction of the invention may be modified in accordance with the characteristics desired in the ware body and the attached flash section. Assuming a constant ram speed and uniform clay body consistency, by changing the distance between the restrictions defining the gutters, both from the standpoint of vertical separation and laterally, as well as the diameter of the gutter itself, it is possible to control the dewatering pressures actually applied to the ware body, with the same or similar overall pressing tonnages, either decreasing or increasing the actual pressures applied to the ware, as desired. Pressed ware bodies are obtained which approach uniformity in moisture content, with relatively high speed applications of pressure to the clay, the pressure being applied for a relatively short time in comparison with the usual practice. Due to the clay compacting and densifying action of the gutter, differential moisture content within a particular ware body in different portions thereof, is substantially reduced.

With molds formed in accordance with the invention, the surfaces of the molds need not be cleansed by an operator after each forming operation. No excess clay is discharged at random from the edges of the molds, necessitating the removal of excess clay masses from and around the molds by an operator.

The principles of the invention may be employed with a single mold, or a pair of molds cooperating in a pressure forming operation, with or without the fluid pressure release mechanism disclosed.

While the invention has been described with reference to the specific embodiments thereof shown in the drawings, the invention is not to be limited save as defined in the appended claims.

We claim:

1. A method of forming ceramic ware comprising pressing a moldable material in a mold to form a ware body, the material being present in excess of that required to form the ware body, forcing excess material from the ware body into a series of parallel gutters adjacent to the mold by the application of pressure in the pressing step, compacting a substantial portion of the excess material during the forcing step, a residual portion being uncompacted in at least the outermost gutter, removing the ware body and compacted material only from the pressing zone, repeating the pressing and removal steps with new charges of moldable material, thus increasing the uncompacted residue of material until sufficient residual material has accumulated to be compacted in the pressing step, and removing the ware body and the compacted material including all residual material as an integral unit from the pressing zone.

2. A mold for pressing plastic clay to form shaped ware comprising cooperable mold sections of a permeable, moisture absorbent material adapted to move between an open position for placing clay therebetween and removing the pressed ware therefrom and a closed position for shaping the ware and placing the clay under pressure, said mold sections having opposed contoured surfaces defining a ware cavity when the mold is in the closed position, a plurality of concentric spaced projections surrounding the contoured surfaces of the mold sections and positioned in opposed relationship on the mold faces thereby defining a plurality of concentric gutters surrounding the contoured surface, the projections being of a height such that opposing projections are spaced apart establishing restricted passages therebetween when the mold sections are in the closed position whereby the clay in excess of that for the ware flows outwardly into the gutters through said restricted passages and the pressure on the clay progressively decreases outwardly in successive gutters, an apertured conduit positioned in the mold sections for the discharge of fluid under pressure to release the ware from the mold sections, and means for supplying a fluid under pressure to the conduits.

3. A mold for pressing plastic clay to form shaped ware comprising cooperable mold sections of a permeable, moisture absorbent material adapted to move between an open position for placing clay therebetween and removing the pressed ware therefrom and a closed position for shaping the ware and placing the clay under pressure, said mold sections having opposed contoured surfaces defining a ware cavity when the mold is in the closed position, a plurality of concentric spaced projections surrounding the contoured surfaces of the mold sections and positioned in opposed relationship on the mold faces thereby defining a plurality of concentric gutters surrounding the contoured surface, the innermost of the gutters being at least as large in cross section as the other gutters, the projections being of a height such that opposing projections are spaced apart establishing restricted passages therebetween when the mold sections are in the closed position whereby the clay in excess of that for the ware flows outwardly into the gutters through said restricted passages and the pressure on the clay progressively decreases outwardly in successive gutters, an apertured conduit positioned in the mold sections for the discharge of fluid under pressure to release the ware from the mold sections, and means for supplying a fluid under pressure to the conduits.

RICHARD E. STEELE.
JACOB JORDAN.

REFERENCES CITED

The following references are of record in the file of this patent:

UNITED STATES PATENTS

| Number | Name | Date |
|---|---|---|
| 656,392 | Cook | Aug. 21, 1900 |
| 1,592,536 | O'Neill | July 13, 1926 |
| 1,597,761 | Burt | Aug. 31, 1926 |
| 1,871,364 | Gibbons | Aug. 9, 1932 |
| 1,993,047 | Westman | Mar. 5, 1935 |
| 2,191,703 | Anderson | Feb. 27, 1940 |
| 2,346,760 | Kleber | Apr. 18, 1944 |